UNITED STATES PATENT OFFICE.

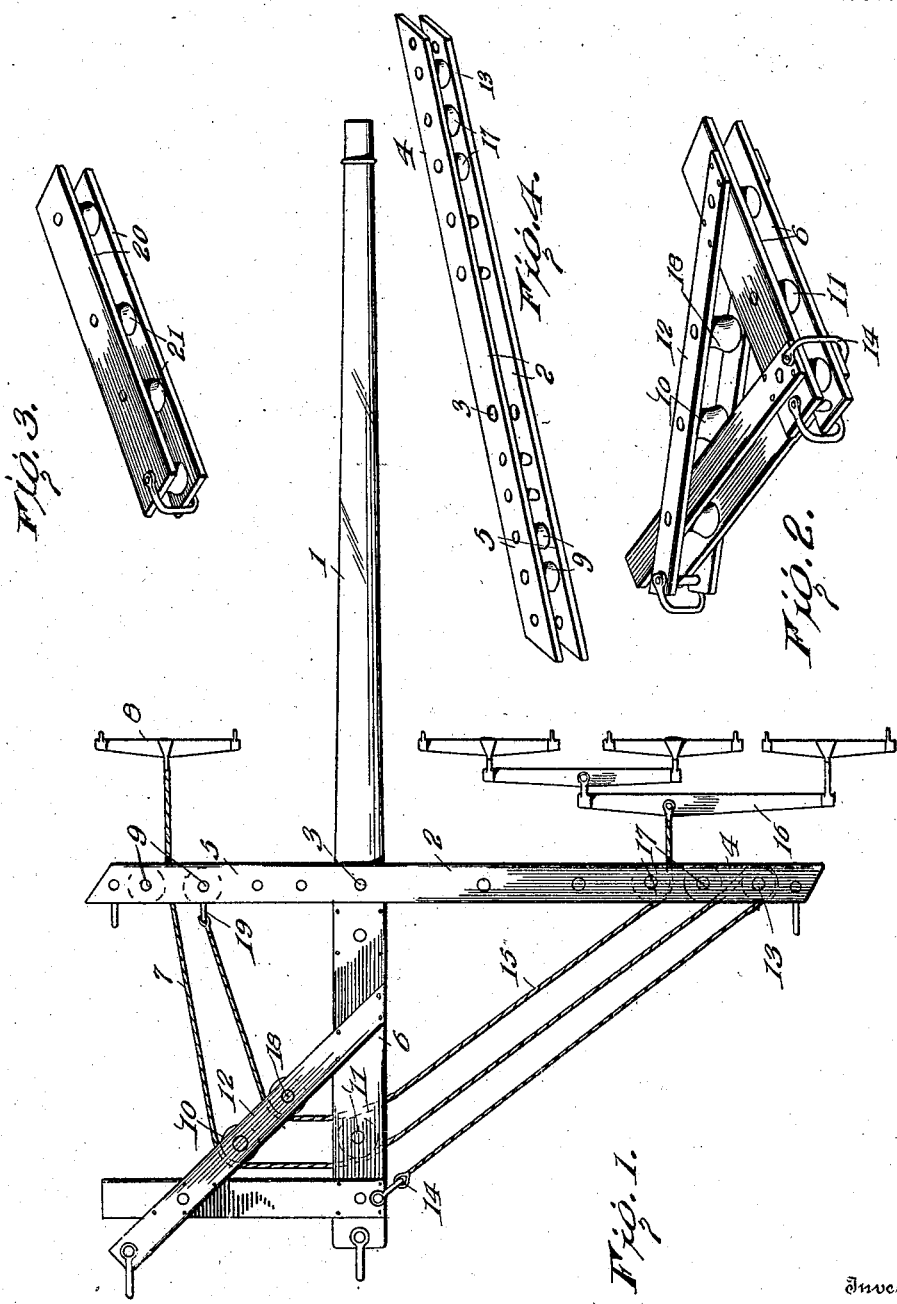

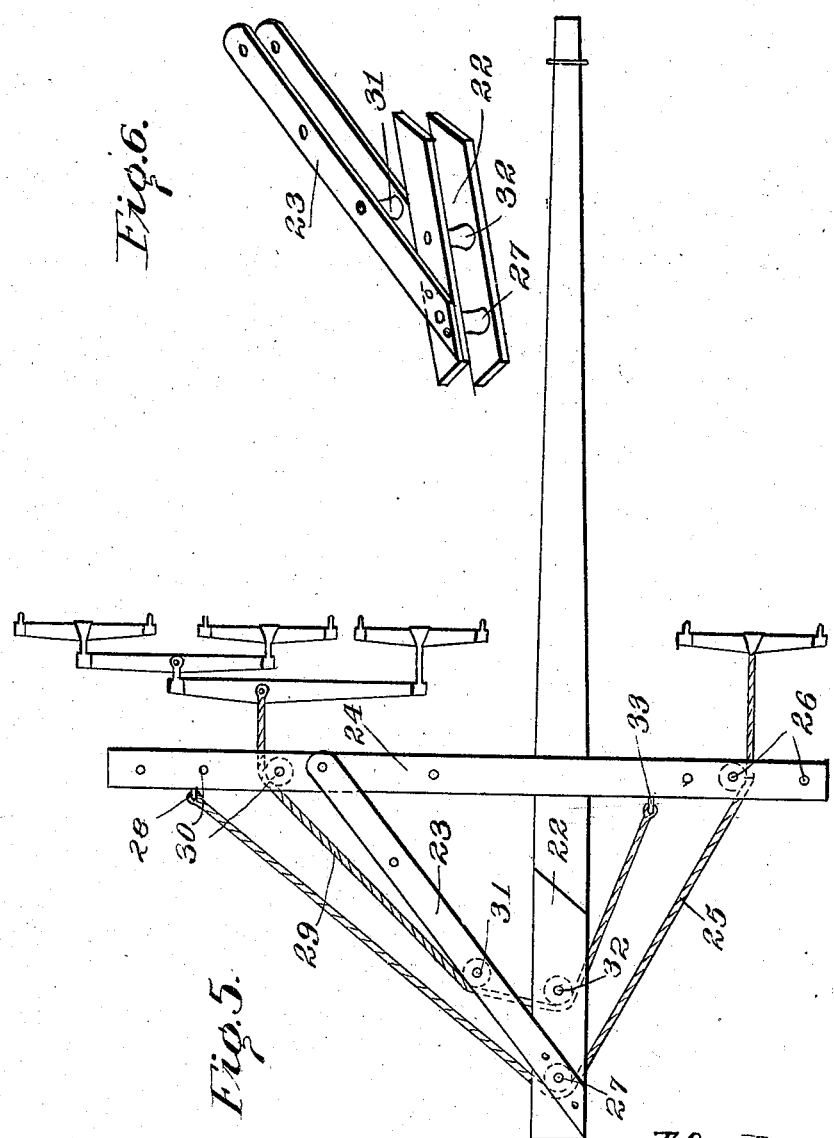

THEODORE C. LAMOUREUX, OF LUTON, IOWA, ASSIGNOR TO LOTTIE LAMOUREUX, OF LUTON, IOWA.

DRAFT-EQUALIZER.

No. 815,298.　　　　Specification of Letters Patent.　　　Patented March 13, 1906.

Application filed August 15, 1905. Serial No. 274,293.

*To all whom it may concern:*

Be it known that I, THEODORE C. LAMOUREUX, a citizen of the United States, residing at Luton, in the county of Woodbury and State of Iowa, have invented certain new and useful Improvements in Draft-Equalizers, of which the following is a specification.

This invention relates to improvements in draft-equalizers, and has for its object to produce a device of this character which will be free from all side draft, which will be simple and durable in construction, and which can be manufactured at comparatively small cost.

With these objects in view the invention consists, essentially, of a lever pivotally mounted upon a tongue and of cables attached to the draft-animals on each side of the tongue and passing through guide members in the lever and the rear of the tongue and adapted to pull backward upon the opposite end of said lever so as to equalize the pull and prevent side draft.

For a full description of the invention and the merits thereof and also to acquire a knowledge of the details of construction of the means for effecting the result reference is to be had to the following description and accompanying drawings, in which—

Figure 1 is a top plan view of a draft-equalizer embodying my invention. Fig. 2 is a perspective view of the attachment which is secured to the tongue in the rear of the main lever. Fig. 3 is a perspective view of a modified form of attachment. Fig. 4 is a perspective view of the main lever, showing the method of constructing same out of two spaced members. Fig. 5 is a top plan view of a draft-equalizer constructed according to my invention and showing a modified form of the attachment which is especially adapted for use in connection with plows. Fig. 6 is a perspective view of the modified form of attachment.

Corresponding and like parts are referred to in the following description and indicated in all the views of the drawings by the same reference characters.

The numeral 1 designates the tongue, and 2 the lever, which is pivoted thereto by means of a pin 3 so as to form a long arm 4 and a short arm 5, said long arm being preferably about twice the length of the short arm. The lever 2 is formed out of two spaced members, which have a number of pulleys mounted between them. The attachment shown in Fig. 2 is secured to the tongue immediately in the rear of the lever 2. This attachment is approximately in the shape of a right triangle, one leg of which is secured to the tongue, while the other two sides project outwardly on the same side of the tongue 1 as the short arm 5 of the lever 2. A cable 7, which is attached to the swingletree 8, passes between two pulleys 9 on the short arm 5 of the lever 2, around the pulleys 10 and 11 on the hypotenuse 12 and the leg 6 of the triangular attachment, and around the pulley 13 on the extremity of the long arm 4 of the lever 2, the end of the cable 7 being secured to the rear of the tongue 1 by means of the hook 14. A similar cable 15 is attached to the doubletree 16 and passes between pulleys 17 on the long arm 4, around the pulley 18 on the hypotenuse 12 of the triangular attachment, and is secured to the short arm 5 at 19. It will thus be seen that the three horses hitched to the doubletree 16 pull backward upon the short arm 5 of the lever 2 at 19 and that owing to the fact that a double pulley is formed the single horse hitched to the swingletree 8 pulls backward upon the extremity of the long arm 4 with a force equal to that of two horses. The distance between the pivot 3 and the point 19 and between said pivot and the pulley 13 can be so adjusted as to equalize the pull of the horses on opposite sides of the tongue 1.

By changing the positions of the various pulleys this device can be adjusted so as to serve either as a one, two, three, four, or five horse evener. When used with two or three horses, the attachment shown in Fig. 3 may be employed instead of the triangular attachment shown in Fig. 2. This attachment simply comprises two spaced members 20, having pulleys 21 mounted between them, around which the cables 7 and 15 are passed. Owing to the peculiar construction of these attachments and the method of passing the cables around pulleys secured in same, all side draft is eliminated.

A modified form of the attachment is shown in Figs. 5 and 6, which is particularly adapted for use in connection with plows. When this modification is employed, four horses can be attached to the plow without necessitating the walking upon the upturned earth by any of them, one of the horses walking in the furrow while the other three are upon the solid ground which has not been plowed. This modified form of attachment comprises two arms 22 and 23, which are rigidly connected to each other and are each formed of two spaced parts, having guide members mounted between them. One of the arms 22 extends along and is secured to the rear portion of the tongue, while the opposite arm 23 projects from one side of the tongue and extends obliquely toward the front thereof. The equalizing-lever 24 is formed of spaced members, as in the previous instance, and is pivoted at an intermediate point to the free end of the arm 23. The long arm of this equalizing-lever crosses the tongue and extends on the opposite side thereof to the arm 23 of the attachment. The single horse is attached to a cable 25, which passes between pulleys 26 at the end of the long arm of the lever 24, said cable then passing around a pulley 27 at the intersection of the two arms of the attachment, and has its end fastened to the short arm of the equalizing-lever at 28. The three horses on the opposite side of the tongue are attached to a similar cable 29, which passes between pulleys 30 on the short arm of the lever, around pulleys 31 and 32 upon the two arms of the attachment, and has its end secured at 33 to the long arm of the lever. By this arrangement the one horse is given a sufficient amount of leverage to equalize the pull of the three horses and all side draft is eliminated.

Having thus described the invention, what is claimed as new is—

1. In a draft-equalizer, the combination of a tongue, an equalizing-lever having a long arm and a short arm, a member extending longitudinally along the tongue in the rear of the equalizing-lever, said member being detachably connected to the tongue and formed of spaced members having a guide member mounted between them, an obliquely-disposed bracket rigidly secured to and projecting from said member, said bracket being formed of spaced parts having a guide member mounted between them, a cable connected to the single horse and passing through guide members on the short arm of the lever, a second cable connected to the plurality of horses on the opposite side of the tongue and passing through guide members on the long arm of the lever, said cables passing around the guide members on the obliquely-disposed bracket and longitudinal member and having their ends rigidly fastened.

2. In a draft-equalizer, the combination of a tongue, an equalizing-lever having a long arm and a short arm, a longitudinal member extending along the tongue in the rear of the equalizing-lever and formed of spaced parts having a guide member mounted between them, an obliquely-disposed bracket projecting from the longitudinal member and also formed of spaced parts having guide members mounted between them, a brace member for the obliquely-disposed bracket, a cable connected to the single horse and passing through guide members on the short arm of the lever, the bracket, the longitudinal member, the long arm of the lever, and having its extremity secured to the tongue, and a second cable connected to the plurality of horses on the opposite side of the tongue and passing through guide members on the long arm of the lever and the bracket, the end of the second cable being secured to the short arm of the lever.

3. In a draft-equalizer the combination of a lever pivoted upon the tongue and having a long arm and a short arm, an attachment secured to the tongue in the rear of said lever, said attachment being triangular in shape, each side of the triangular attachment comprising two spaced parts having guide members mounted between them, one of the sides extending along the tongue while the other sides project outwardly on the same side of the tongue as the short arm of the lever, a cable connected to the single horse and passing through guideways on the short arm of the lever and the outwardly-projecting portion of the attachment, said cable then passing around a pulley on the long arm of the lever and having its extremity secured to the tongue, a second cable attached to the plurality of horses on the opposite side of the tongue and passing through guide members on the long arm of the lever and the attachment, and having its end secured to the short arm of the lever.

In testimony whereof I affix my signature in presence of two witnesses.

THEODORE C. LAMOUREUX. [L. S.]

Witnesses:
ARTHUR LAMOUREUX,
NEILS ERICKSON.